Feb. 5, 1924.  
W. J. TIDEMAN  
ADJUSTABLE CASTER  
Filed Dec. 10, 1921  
1,482,953
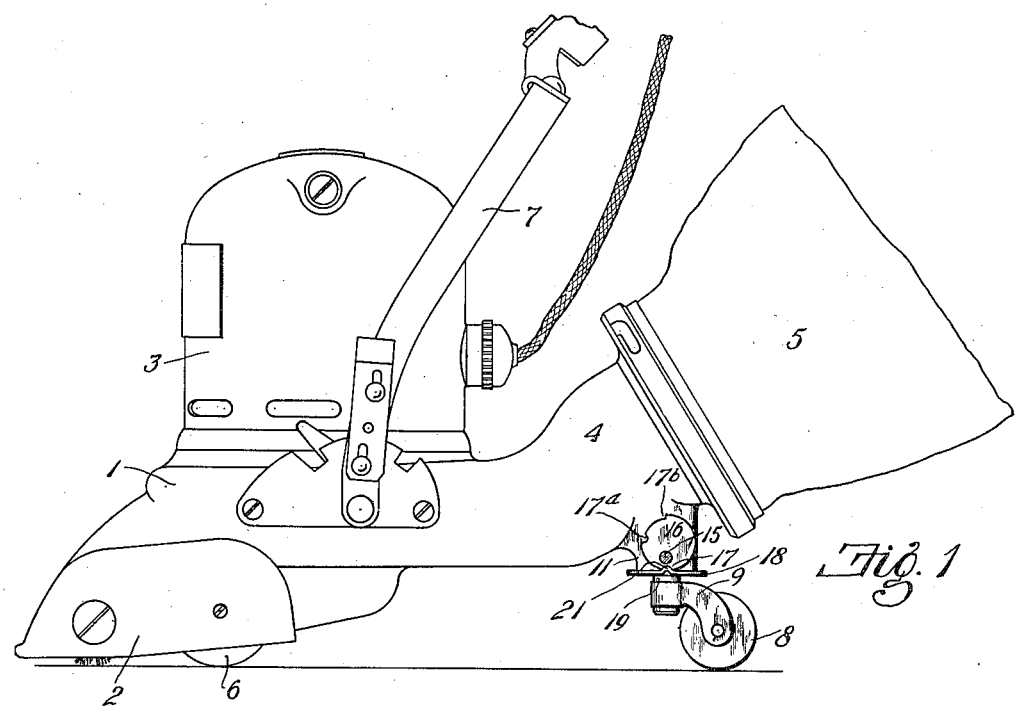
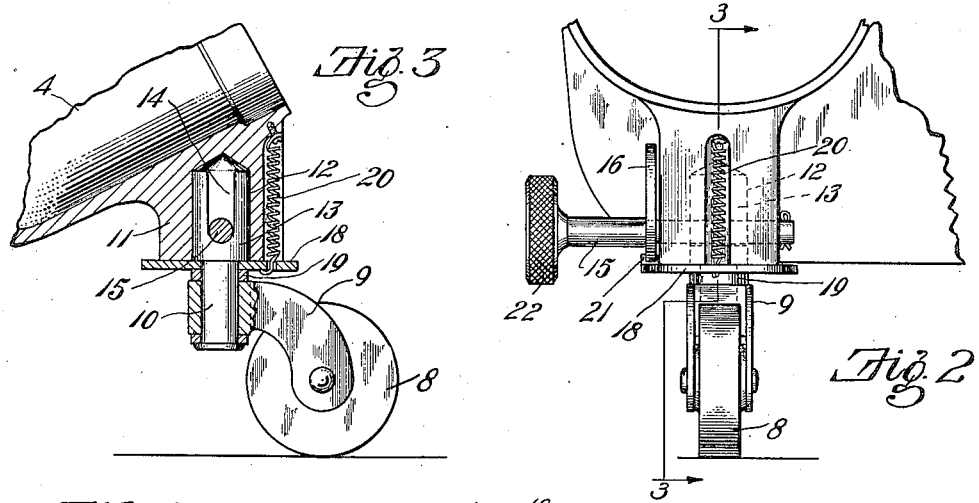
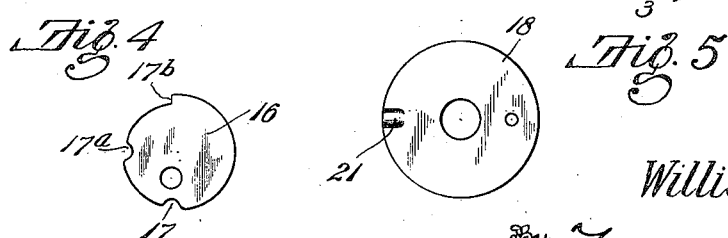
Inventor  
William J. Tideman  
By Frease and Bond  
Attorneys Patented Feb. 5, 1924.

1,482,953

UNITED STATES PATENT OFFICE.

WILLIAM J. TIDEMAN, OF CANTON, OHIO, ASSIGNOR TO THE UNITED ELECTRIC COMPANY, OF CANTON, OHIO, A CORPORATION.

ADJUSTABLE CASTER.

Application filed December 10, 1921. Serial No. 521,340.

*To all whom it may concern:*

Be it known that I, WILLIAM J. TIDEMAN, a citizen of the United States, residing at Canton, in the county of Stark and State of Ohio, have invented a new and useful Improvement in Adjustable Casters, of which the following is a specification.

This invention relates to a caster for the rear end of a portable vacuum cleaner or similar use, wherein it is desirable to adjust the caster vertically with reference to the machine, to tilt the same upward or downward upon its forward wheels, and wherein the vibration of the machine tends to change the adjustment; and the objects of the improvement are to provide simple means for adjusting such a caster to a plurality of positions and for stopping or holding it in the various positions.

The above and other objects may be attained by providing a shank upon which the caster bracket is carried and slidably mounting said shank within a socket formed in the machine, spring means being provided for normally urging the shank upward and a cam being mounted upon the machine for moving the shank downward against the action of the spring, said cam being provided with notches arranged to engage a detent upon the shank for locking the shank at the desired adjustment.

An embodiment of the invention thus set forth in general terms is illustrated in the accompanying drawing, in which—

Figure 1 is a side elevation of a portable vacuum cleaner showing the improved caster thereon;

Fig. 2, a rear elevation of the caster and adjusting means.

Fig. 3, a section on the line 3—3, Fig. 2;

Fig. 4, a detail view of the cam; and

Fig. 5, a detail view of the disk carried by the shank.

Similar numerals of reference indicate corresponding parts throughout the drawing.

The suction cleaner illustrated includes the fan casing 1 provided upon its forward side with the suction nozzle 2, on top with the motor casing 3 and in the rear with the discharge outlet 4 leading to the dust collecting bag 5, the nozzle portion of the machine being usually supported upon the wheels 6; and on each side of the casing is pivoted a handle bail 7, by means of which the machine is manipulated.

The machine being supported at its forward end upon the wheels 6, the same can be tilted upward or downward by lowering or raising the rear end thereof; and for the purpose of limiting the downward movement, a rear caster 8 is usually provided. By making this rear caster adjustable vertically, with reference to the rear end of the machine, the normal position of the nozzle with reference to the floor or carpet, can be varied.

For the purpose of the present invention, the rear caster 8 is preferably journaled within the bifurcated bracket 9 which may be swiveled upon the lower end portion of the shank 10. The rear portion of the casing is provided with the depending boss 11 having the vertical bore or socket 12 open through the lower end thereof and arranged to receive the enlarged portion 13 of the shank 10 which is slotted as at 14 to accommodate the cam shaft 15 journaled through the boss which carries the eccentric cam 16 provided around its periphery with spaced notches 17, 17$^a$ and 17$^b$.

A disk 18 is fixed upon the intermediate portion of the shank 10 between the shouldered portion 13 and the washer 19 and is connected to the lower end of the contraction spring 20, the upper end of which is connected to the casing, tending to normally hold the shank in its upper position as shown in the drawings.

The disk 18 is provided with a detent 21 arranged to selectively engage the notches upon the adjusting cam as the cam is rotated by means of the head 22. With the caster in its upper position, the detent 21 will engage the notch 17 as best shown in Fig. 1, the spring 20 urging the shank upward and holding the parts in this adjusted position.

When it is desired to lower the caster, the cam is rotated to engage either of the notches 17$^a$ or 17$^b$ with the detent, the notch 17$^b$ acting as a stop to limit the movement of the cam in this direction.

By this construction and arrangement, it is evident that the bracket carrying the rear caster may be adjusted to and from the bottom of the vacuum cleaner by merely turning the adjusting cam one way or another, and that when a particular adjustment is given to the caster, the cam will be normally held against rotation by the action of the spring holding the detent in engagement with the adjacent notch in the cam, the weight of the machine bearing upon the disk 18 also serves to hold the parts in the adjusted position, preventing vibrations of the machine from accidentally displacing the parts.

I claim:—

1. A caster for a vacuum cleaner or the like having a vertical bore therein, a shank vertically adjustable within the bore, and provided with a vertical slot, said shank being provided with a disc, a caster upon the shank, spring means for normally urging the shank upward, a shaft extending transversely through the slot and an eccentric cam upon the shaft engaging said disc to move the shank downward.

2. A caster for a vacuum cleaner or the like having a vertical bore therein, a shank vertically adjustable within said bore, and provided with a vertical slot, said shank being provided with a disc, a caster upon the shank, spring means for normally urging the shank upward, a shaft extending transversely through the slot and an eccentric cam upon the shaft engaging said disc to move the shank downward, the cam and disc having co-operating notches and a detent for locking the shank in adjusted positions.

3. A caster for a vacuum cleaner or the like having a vertical bore therein, a shank vertically adjustable within said bore and provided with a vertical slot, said shank being provided with a disk having a detent, a caster upon the shank, means for normally urging the shank upward, a shaft extending transversely through the slot and an eccentric cam upon the shaft engaging said shoulder to move the shank downward, the cam having notches for engagement with said detent for locking the shank in adjusted positions.

WILLIAM J. TIDEMAN.